(No Model.)
M. D. SMALLEY.
BICYCLE STEERING GEAR.
No. 533,564. Patented Feb. 5, 1895.
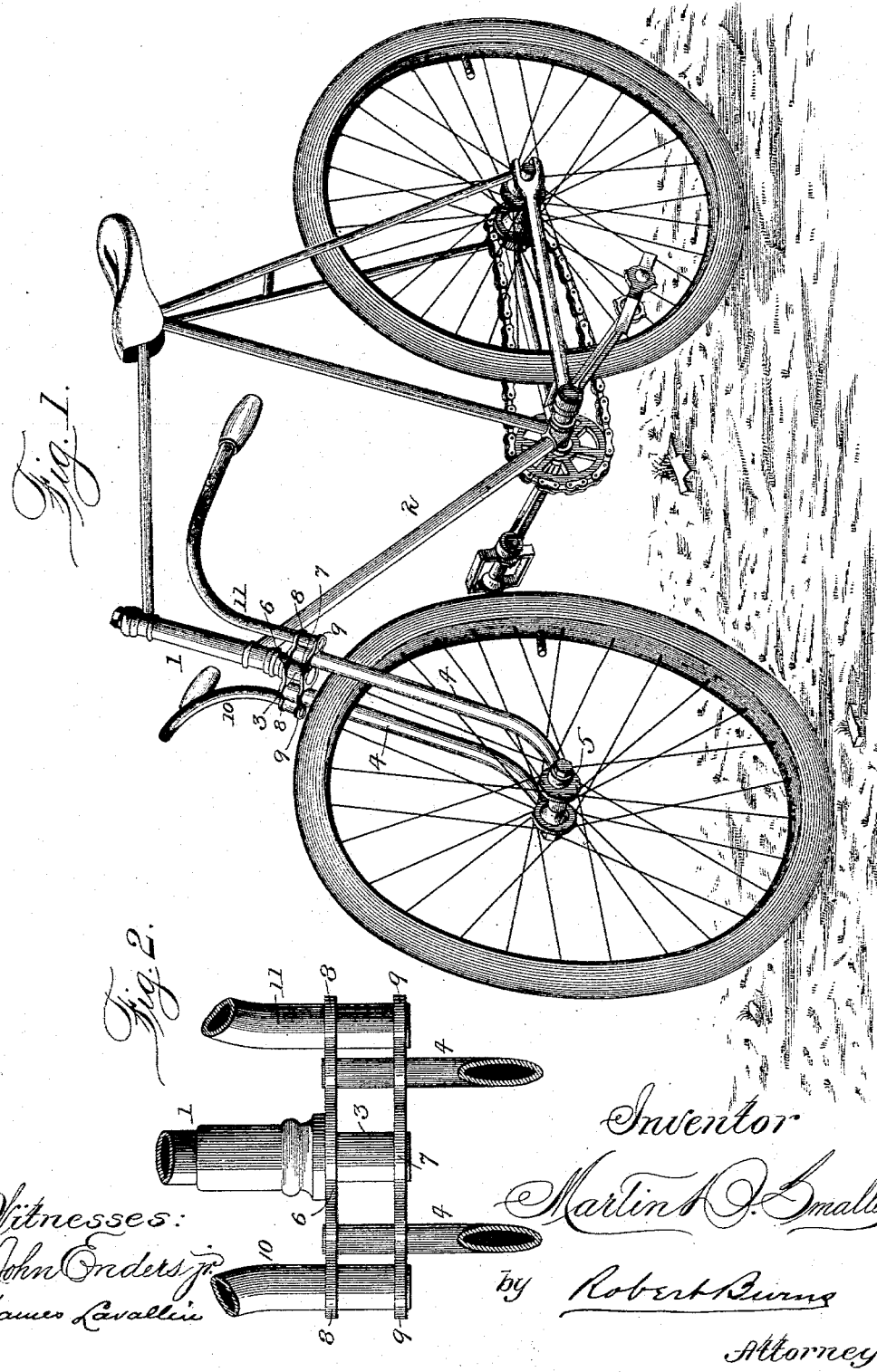

UNITED STATES PATENT OFFICE.

MARTIN D. SMALLEY, OF PLYMOUTH, INDIANA.

BICYCLE STEERING-GEAR.

SPECIFICATION forming part of Letters Patent No. 533,564, dated February 5, 1895.

Application filed September 4, 1894. Serial No. 522,096. (No model.)

*To all whom it may concern:*

Be it known that I, MARTIN D. SMALLEY, a citizen of the United States, residing at Plymouth, in the county of Marshall and State of Indiana, have invented certain new and useful Improvements in Bicycle Steering-Gear; and I do hereby declare the following to be a full, clear, and exact description of the same, reference being had to the accompanying drawings, forming part of this specification.

This invention relates to the steering gear of safety bicycles and more especially to that type of steering gear in which both wheels are of a substantially uniform size, the front wheel being used solely for steering, and the rear wheel for driving purpose; and the object of the present improvement is to provide a simple, strong and durable arrangement of the steering mechanism of such type of bicycles, whereby the strain or force exerted in the steering operation, is brought down into close relation to the axis of the steering wheel, to attain a very positive, and at the same time easy and accurate steering movement, that the present improvement is attained by the attachment of the steering bars or handles to the rigid cross head of the steering fork, immediately beneath the elongated fulcrum bearing of the same in the main bicycle frame. With the present improvement an entire elimination is effected, of the very objectionable feature or element of torsional elasticity that exists in the usual arrangement of the steering arms or handles, at the upper end of the long and comparatively slender fulcrum spindle of the steering fork of a safety bicycle and which fulcrum spindle, is, in rapid riding exposed to sudden and extreme torsional strains, and being unable to fully resist the same, will yield in a measure thereto, and interfere in a material degree with a positive and accurate steering action. I attain such objects by the construction and arrangement of parts illustrated in the accompanying drawings, in which—

Figure 1, is a detail perspective view of a safety bicycle, illustrating my present invention; Fig. 2, an enlarged detail front elevation of the same.

Similar numerals of reference indicate like parts in both views.

Referring to the drawings, 1 represents the tubular head at the forward end of the main frame 2 of the machine, in which is pivotally arranged in any usual manner the arbor or pivot shank 3, of the forward steering fork.

The steering fork consists of the usual curved tines or fingers 4, having at their lower ends the usual attaching eyes 5 for the axle of the forward or steering wheel of the bicycle; and in the present invention the upper ends of these fingers or tines pass through proper orifices in the pair of counterpart plates 6 and 7, and are brazed or otherwise attached thereto in a solid and substantial manner.

The counterpart plates 6 and 7, have a parallel relation to each other and arranged a proper distance apart, and conjointly afford an attachment for the tines or fingers of the steering fork as above described, as well as for the central arbor or pivot shank 3, which passes down through suitable centrally arranged orifices in the plates and are brazed or otherwise secured therein in a firm and substantial manner.

The counterpart plates 6 and 7, are extended laterally to form side lugs or extensions 8 and 9, having orifices for the reception of the inner or lower ends of the steering bars or handles 10, and 11, which are also brazed or otherwise secured therein in a firm and substantial manner, and such steering arms or handles will extend upwardly, outwardly and rearwardly, into convenient reach of the rider's hands.

With the present improved construction the parts are secured together in a strong and substantial manner, and at the same time great structural lightness is attained, which is an object of great moment, more especially in rapid riding or racing bicycles. The present improvement also attains a very accurate, easy and sensitive adjustment of the steering gear.

I am aware that prior to my invention, bicycles of that type, in which a high forward, driving and steering wheel is employed, have been constructed with steering bars or handles attached to the steering head or forks, and extending downwardly, and outwardly, so as to occupy a position behind the legs of the rider, and then upwardly into a position to be grasped by the hands of the rider, the sole purpose being to afford a special construction that will enable the rider to leave the machine in a forward and sidewise direction without obstruction; but in none of these prior constructions could the object or purpose of the present invention be attained, in that the fulcrum spindle of the steering forks of such prior constructions were of a short and stubby nature, not capable of an appreciable torsional strain, and hence requiring no provision for the elimination of the same; and the further fact, that the arms of such prior high wheel bicycles were of such a lengthened nature that no provisions could be made to prevent a springing of the same in use, and was an organic defect in the high wheel type of bicycles, among others, that led to their disuse.

Having thus fully described my said invention, what I claim as new, and desire to secure by Letters Patent, is—

1. The combination in a safety bicycle, of a steering wheel a main frame having a vertically elongated fulcrum sleeve, a steering fork fulcrumed in said sleeve, and consisting of an elongated fulcrum shank, a pair of tines and a connecting cross head, and a pair of upwardly and rearwardly curved steering bars or handles, secured to the outer ends of the steering fork cross heads, substantially as set forth.

2. The combination in a safety bicycle, of a steering fork composed of tines or fingers, and a central pivot arbor, attached together by a pair of counterpart plates having a separated arrangement, with the adjacent ends of the fingers and the arbor secured in orifices in said plates, substantially as set forth.

3. The combination in a safety bicycle, and its elongated fulcrum sleeve and fulcrum shank, of a steering fork, provided with lugs that project outward from opposite sides of the fork, and a pair of outwardly and rearwardly extending steering handles or bars the lower ends of which are secured in vertical orifices in said lugs, substantially as set forth.

4. The combination in a safety bicycle, of a steering fork composed of tines or fingers, a pair of steering bars, and a central pivot arbor, attached together by a pair of counterpart plates having a separated arrangement, with the adjacent ends of the fingers, steering bars, and arbor secured in orifices in said plates, substantially as set forth.

In testimony whereof witness my hand this 17th day of August, 1894.

MARTIN D. SMALLEY.

In presence of—
ROBERT BURNS,
JAMES LAVALLIN.